United States Patent
Harayama

(10) Patent No.: US 11,627,236 B2
(45) Date of Patent: Apr. 11, 2023

(54) SHAPING DEVICE AND SHAPING METHOD UTILIZING COLOR CONVERSION PROCESS AND COLOR ADJUSTMENT PARAMETERS

(71) Applicant: MIMAKI ENGINEERING CO., LTD., Nagano (JP)

(72) Inventor: Kenji Harayama, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 424 days.

(21) Appl. No.: 16/702,556

(22) Filed: Dec. 4, 2019

(65) Prior Publication Data
US 2020/0198247 A1    Jun. 25, 2020

(30) Foreign Application Priority Data
Dec. 19, 2018  (JP) .............................. JP2018-237450

(51) Int. Cl.
*H04N 1/60* (2006.01)
*B29C 64/112* (2017.01)
*B33Y 50/00* (2015.01)

(52) U.S. Cl.
CPC .......... *H04N 1/6019* (2013.01); *B29C 64/112* (2017.08); *B33Y 50/00* (2014.12);
(Continued)

(58) Field of Classification Search
CPC ................. B29C 64/112; B33Y 50/00; H04N 1/6008–6077
See application file for complete search history.

(56) References Cited

U.S. PATENT DOCUMENTS 6,345,128 B1 * 2/2002 Stokes .................. H04N 1/407
   382/254
9,114,625 B2 * 8/2015 Miller ..................... A43B 5/02
(Continued)

FOREIGN PATENT DOCUMENTS

EP        3439280        2/2019
JP      2015071282       4/2015
(Continued)

OTHER PUBLICATIONS

Alan Brunton, Can Ates Arikan, and Philipp Urban, Pushing the Limits of 3D Color Printing: Error Diffusion with Translucent Materials, ACM Transactions on Graphics, vol. 35, No. 1, Article 4, Publication date: Dec. 2015 (Year: 2015).*
(Continued)

*Primary Examiner* — Barbara D Reinier
(74) *Attorney, Agent, or Firm* — JCIPRNET

(57) ABSTRACT

A shaping device is provided and includes a head portion that ejects a material of a shaped object, and a controller that controls the operation of the head portion based on ejecting position specifying data indicating a position to eject the material of each color, the ejecting position specifying data being data in which a color is expressed in a predetermined material color space. The controller generates the ejecting position specifying data based on input data in which colors are expressed in a predetermined input color space, and in the process of generating the ejecting position specifying data, performs a color conversion process of converting a color using at least a profile that associates the color in the input color space with the color in the material color space, and a color adjustment parameter which is a parameter used for adjustment performed for color conversion performed using the profile.

16 Claims, 6 Drawing Sheets

(52) U.S. Cl.
CPC ......... *H04N 1/6008* (2013.01); *H04N 1/6027* (2013.01); *H04N 1/6058* (2013.01); *H04N 1/6069* (2013.01); *H04N 1/6077* (2013.01)

(56) References Cited

U.S. PATENT DOCUMENTS

| | | | |
|---|---|---|---|
| 2016/0151980 A1* | 6/2016 | Hatanaka | G05B 19/4099 700/98 |
| 2017/0136706 A1 | 5/2017 | Hakkaku | |
| 2018/0009230 A1 | 1/2018 | Ohnishi et al. | |
| 2018/0162056 A1 | 6/2018 | Kaneko et al. | |
| 2018/0162144 A1* | 6/2018 | Miller | D06P 5/15 |
| 2018/0250883 A1 | 9/2018 | Nagahari et al. | |
| 2018/0264723 A1 | 9/2018 | Ochi et al. | |
| 2021/0354502 A1* | 11/2021 | Mahy | H04N 1/6058 |

FOREIGN PATENT DOCUMENTS

| | | |
|---|---|---|
| JP | 2018039126 | 3/2018 |
| JP | 2018043465 | 3/2018 |
| JP | 2018094784 | 6/2018 |
| WO | 2018079416 | 5/2018 |

OTHER PUBLICATIONS

"Search Report of Europe Counterpart Application", dated Jun. 5, 2020, p. 1-p. 12.
"Office Action of Japan Counterpart Application" with English translation thereof, dated Apr. 19, 2022, p. 1-p. 6.

* cited by examiner

SHAPING DEVICE AND SHAPING METHOD UTILIZING COLOR CONVERSION PROCESS AND COLOR ADJUSTMENT PARAMETERS

CROSS REFERENCE TO RELATED APPLICATIONS

This application claims the priority benefit of Japanese Patent Application No. 2018-237450, filed on Dec. 19, 2018. The entirety of the above-mentioned patent application is hereby incorporated by reference herein and made a part of this specification.

TECHNICAL FIELD

The present disclosure relates to a shaping device and a shaping method.

DESCRIPTION OF THE BACKGROUND ART

Conventionally, a shaping device (3D printer) for shaping a shaped object using an inkjet head is known (see e.g., Japanese Unexamined Patent Publication No. 2015-071282 (Patent Literature 1)). In such a shaping device, for example, the shaped object is shaped through a layered shaping method by overlapping a plurality of layers of ink formed by an inkjet head.

Patent Literature 1: Japanese Unexamined Patent Publication No. 2015-071282.

SUMMARY

When shaping a shaped object using an inkjet head, the colored shaped object can be shaped by using inks of a plurality of colors. However, in this case, a difference may occur between the color of the completed shaped object and the imaged color due to factors such as for example, the shape of the shaped object. In this case, it is usually necessary to re-edit the input data indicating the shaped object with modeling software or the like to adjust the color. However, when adjusting the color in such a manner, the labor required for reworking increases, and the work efficiency greatly reduces. Thus, it is conventionally desired to more appropriately carry out the color adjustment of the shaped object. The present disclosure thus provides a shaping device and a shaping method capable of overcoming such problem.

Through intensive researches, the inventor of the present application considered adjusting the color of the shaped object not by editing the input data, and the like but by adjusting the manner of converting the color in a color conversion process performed on the input data. More specifically, when shaping a colored shaped object using inks of a plurality of colors, the color conversion process is usually performed on the color specified in the input data using a profile prepared in advance according to the color of the ink to be used (e.g., ICC profile). In this case, the color of the shaped object can be adjusted without re-editing the input data, and the like by adjusting (correcting) the manner of converting the color in the color conversion process.

More specifically, the inventor of the present application considered the use of color adjustment parameters in addition to the profile regarding the manner of adjusting the color in this way. In this case, the color adjustment parameter is, for example, a parameter used for adjustment made on color conversion performed using a profile. When configured in such a manner, for example, the color of a shaped object can be adjusted appropriately, for example, while appropriately preventing increase in labor due to reworking, and the like.

Furthermore, through further thorough research, the inventor of the present application found features necessary for obtaining such effects and contrived the present disclosure. In order to solve the problem described above, the present disclosure provides a shaping device for shaping a stereoscopic shaped object in which at least a part is colored, the shaping device including a head portion that ejects materials of a plurality of colors different from each other as a material of the shaped object; and a controller that controls operation of the head portion based on ejecting position specifying data indicating a position to eject the material of each color, the ejecting position specifying data being data in which a color with respect to at least a part of the shaped object is expressed in a material color space which is a color space corresponding to the color of the material used to color the shaped object; where the controller generates the ejecting position specifying data based on input data input as data indicating the shaped object, the input data being data in which a color of at least a part of the shaped object is expressed in an input color space which is a color space different from the material color space, and in the process of generating the ejecting position specifying data, performs a color conversion process of converting a color using at least a profile that associates the color in the input color space with the color in the material color space, and a color adjustment parameter which is a parameter used for adjustment performed for color conversion performed using the profile.

According to such a configuration, for example, the color of the shaped object can be adjusted without performing re-editing and the like of input data. Thus, for example, the adjustment of the color of the shaped object can be appropriately performed while appropriately preventing an increase in labor due to rework.

In this configuration, the head portion includes, for example, a plurality of inkjet heads, each of which ejects ink of different colors. In this case, the ink is an example of a material of the shaped object. As the ink, for example, an ultraviolet curable ink or the like can be suitably used. Moreover, for example, a shaping device shapes a shaped object by layering a layer of material in a preset layering direction. The controller performs, for example, a slice process of setting the shape and color of a cross section of the shaped object at a position corresponding to each layer and a color conversion process to generate the ejecting position specifying data specifying a position to eject the material at the time of forming each layer. According to such a configuration, for example, the ejecting position specifying data reflecting the result of adjusting the color can be appropriately generated.

Furthermore, in this configuration, for example, it is conceivable to use a parameter for associating a value before adjustment with a value after adjustment for one color as a color adjustment parameter. In this case, the value before adjustment is, for example, the density of the color (color strength) before adjustment. The value after adjustment is, for example, the density of the color after adjustment. Furthermore, the parameter for associating the value before adjustment and the value after adjustment may be, for example, a parameter that specifies a correspondence relationship such as a function that determines the association. The color adjustment performed using the color adjustment parameter may be considered as, for example, a density conversion process for converting the density of the color.

In this configuration, as the color conversion process, for example, a process of converting a color expressed by a plurality of input basic colors which are a plurality of basic colors in the input color space to a color expressed by a plurality of material basic colors which are a plurality of basic colors in the material color space is considered. More specifically, for example, an RGB color space can be used as the input color space. In this case, it is conceivable to use R (red), G (green), and B (blue) colors as the plurality of input basic colors. Furthermore, as a material used for coloring, for example, it is conceivable to use a material of each color of C (cyan) color, M (magenta) color, Y (yellow) color, and K (black) color. In this case, it is conceivable to use, for example, a CMYK color space as the material color space. Moreover, in this case, as the profile, for example, a profile (input/output profile) that associates a color in the RGB color space with a color in the CMYK color space may be used. As such a profile, for example, a known profile such as an ICC profile can be suitably used.

In this case, for example, it is conceivable to perform the color adjustment using the color adjustment parameter on the color after conversion performed using the profile. More specifically, in this case, the controller performs, for example, a profile conversion process and a post-conversion adjustment process in the color conversion process. The profile conversion process is, for example, a process of converting a color expressed by the plurality of input basic colors into a color expressed by the plurality of material basic colors based on the profile. The post-conversion adjustment process is, for example, a process of performing adjustment with respect to the result of the profile conversion process, and adjusts a color based on the color adjustment parameter prepared in advance for each color of the plurality of material basic colors. According to such a configuration, for example, the adjustment of the color of the shaped object can be appropriately carried out.

Furthermore, the color adjustment using the color adjustment parameter may be performed, for example, on a color before conversion performed using a profile. More specifically, in this case, the controller performs pre-conversion adjustment process and a profile conversion process in the color conversion process. The pre-conversion adjustment process is a process performed before the process of converting the color performed based on the profile, and for example, adjusts a color based on the color adjustment parameter prepared in advance for each color of the plurality of input basic colors. In this case, the profile conversion process is, for example, a process of converting a color expressed by the plurality of input basic colors into a color expressed by the plurality of material basic colors based on the profile, and performs conversion of color with respect to a color subjected to adjustment by the pre-conversion adjustment process. According to such a configuration as well, for example, the adjustment of the color of the shaped object can be appropriately carried out.

Moreover, in a stereoscopic shaped object, it may be considered that a difference occurs in the way the color is seen depending on the position of the shaped object. In this case, for example, it may be possible to change the manner of adjusting the color depending on the region of the shaped object. More specifically, in this case, in the color conversion process, for example, the controller performs color conversion using the profile and a first color adjustment parameter with respect to a first region in the shaped object. Then, the controller performs color conversion using the profile and a second color adjustment parameter different from the first color adjustment parameter with respect to a second region of the shaped object different from the first region in the shaped object. In this case, for example, it is conceivable to use the same profile for the first region and the second region for the profile. Moreover, for the profile, it is possible to use the same profile with respect to the entire shaped object. With such a configuration, for example, the adjustment of the color that matches each region of the shaped object can be appropriately performed. In addition, such an operation can be considered as, for example, an operation of varying the correspondence of colors before and after conversion between a time of conversion of color performed with respect to a first region of the shaped object and a time of conversion of color performed with respect to a second region.

Furthermore, in this case, it is conceivable to determine which color adjustment parameter to use for which region based on, for example, a user's instruction. More specifically, in this case, the controller receives, for example, an instruction to select the first region and an instruction to select the first color adjustment parameter from a user. According to such a configuration, for example, adjustment based on a user's instruction can be appropriately performed on each region of the shaped object. Furthermore, in this case, for the second region as well, for example, an instruction to select the region and the color adjustment parameter may be received. Moreover, it is conceivable to perform color adjustment through a preset standard method, for example, with respect to a region to which a user's specification is not received.

Furthermore, in a case where the manner of adjusting the color varies depending on the region of the shaped object, for example, it is conceivable to set the manner of adjusting the color for each plane configuring the surface of the shaped object. In this case, for example, it is considered to set a region corresponding to any plane in the surface of the shaped object as the first region. Furthermore, as the second region, for example, it is conceivable to set a region corresponding to a plane in which an inclination with respect to the horizontal plane is different from the plane corresponding to the first region in the surface of the shaped object. According to such a configuration, the adjustment of color for each plane can be appropriately performed.

In addition, for example, it may be possible to automatically select a color adjustment parameter used in the color conversion process. In this case, for example, it is conceivable to automatically set the color adjustment parameter in the controller based on the shape of the shaped object indicated by the input data and the like. In addition, regarding the selection of the color adjustment parameter that is automatically performed, for example, it is conceivable that the measurement of a color with respect to the result of actually performing the shaping is performed, and the color adjustment parameter is automatically selected based on the measurement result. More specifically, in this case, the controller sets the color adjustment parameter to use at the time of shaping the shaped object to be subsequently shaped based on the result of measuring the color expressed in the shaped object shaped in the past by the shaping device, for example. According to such a configuration, for example, color adjustment can be performed more easily and appropriately.

Moreover, consideration is made to set the color adjustment parameter to use in the color conversion process, for example, according to the configuration of the shaped object. In this case, for example, it is conceivable to change the color adjustment parameter to use according to the thickness of a region to be colored in the shaped object.

More specifically, in the shaping device, for example, a shaped object including a light reflecting region and a region to be colored may be shaped. In this case, the light reflecting region is a region formed using, for example, a light reflective material. Furthermore, for example, the region to be colored is a region that is colored using materials of a plurality of colors at the periphery of the light reflecting region. In this case, it is considered that the color (e.g., color density etc.) expressed in the region to be colored usually varies depending on the thickness of the region to be colored. The thickness of the region to be colored is, for example, the thickness in the normal direction of the surface of the shaped object. In this case, in the color conversion process, the controller changes the color adjustment parameter to use, for example, according to the thickness of the region to be colored. With such a configuration, for example, the adjustment of the color that matches the thickness of the region to be colored can be appropriately performed.

Furthermore, when focusing on the point of varying the manner of adjusting the color depending on the region of the shaped object in the color conversion process, as a configuration of the present disclosure, for example, a configuration and the like that varies the association of colors before and after the conversion between time of conversion of color performed with respect to a first region of the shaped object and a time of conversion of color performed with respect to a second region of the shaped object different from the first region may be considered. Use of a shaping method having the features similar to above, and the like can be considered for the configuration of the present disclosure. In this case as well, for example, effects similar to above can be obtained. Furthermore, such a shaping method can be considered as, for example, a manufacturing method for a shaped object.

According to the present disclosure, for example, the color of a shaped object can be adjusted appropriately.

BRIEF DESCRIPTION OF THE DRAWINGS

FIG. 1A shows an example of a configuration of the shaping system 10. FIG. 1B shows an example of a configuration of a main part of a shaping device 12. FIG. 1C shows an example of a configuration of a head portion 102.

FIG. 4A shows an example of an operation of the color conversion process. FIG. 4B shows an example of a color density curve 302 that is different from the case shown in FIG. 4A.

FIG. 5A shows an example of the relationship between the thickness of the region to be colored 156 and the color density. FIGS. 5B and 5C show examples of adjusting the thickness of the region to be colored 156.

FIGS. 6A and 6B show examples of a region to be selected when adjustment of color for each region is performed using the color adjustment parameter.

DETAILED DESCRIPTION OF EMBODIMENTS

Figure 1A:
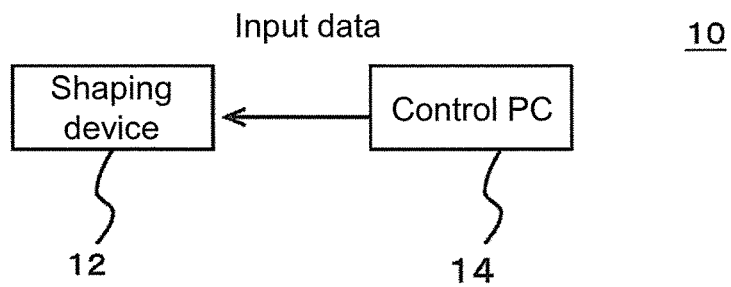
FIGS. 1A to 1C are views showing an example of a shaping system 10 according to an embodiment of the present disclosure.
Figure 1B:
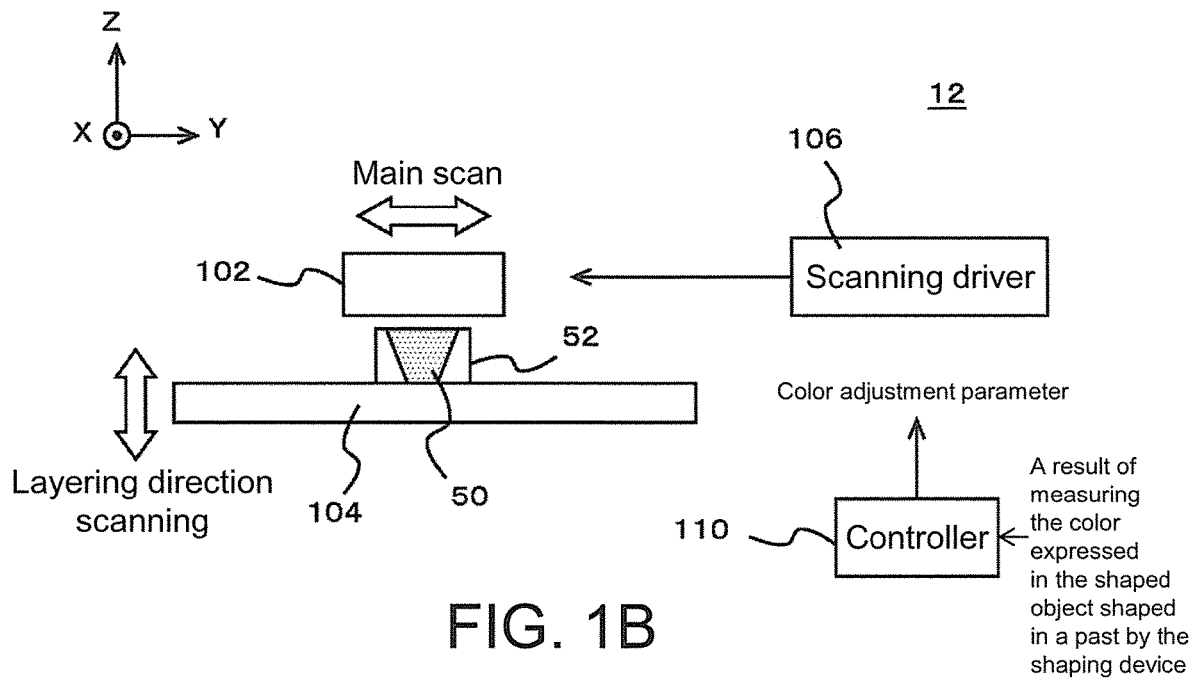
Figure 1C:
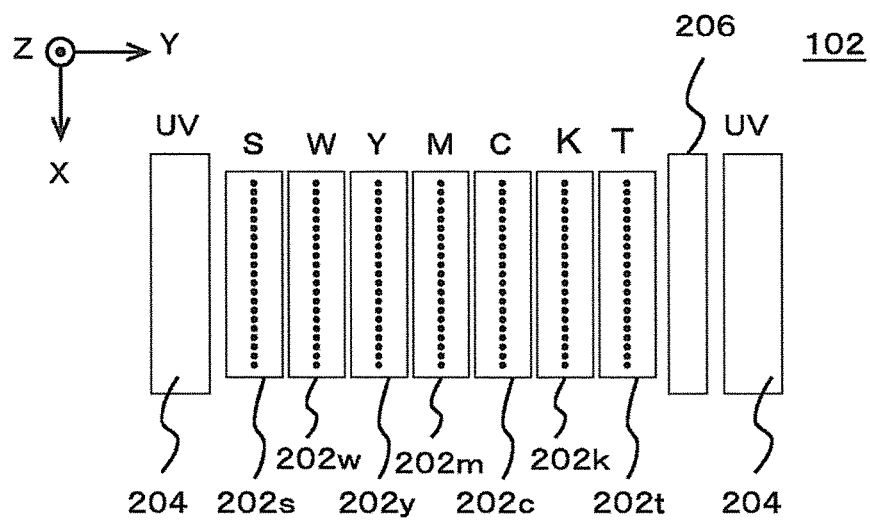

Hereinafter, an embodiment according to the present disclosure will be described with reference to the drawings. FIGS. 1A to 1C show an example of a shaping system 10 according to an embodiment of the present disclosure. FIG. 1A shows an example of a configuration of the shaping system 10. In the present example, the shaping system 10 is a shaping system for shaping a stereoscopic shaped object, and includes a shaping device 12 and a control PC 14.

The shaping device 12 is a device that executes shaping of a shaped object, and shapes a shaped object according to the control of the control PC 14. More specifically, the shaping device 12 is a full-color shaping device (full-color 3D printer) capable of shaping a shaped object colored in full color, and receives input data indicating the shaped object to be shaped from the control PC 14 and shapes a stereoscopic shaped object in which at least a part is colored based on the received input data.

The control PC 14 is a computer (host PC) that controls the operation of the shaping device 12 and provides the input data to the shaping device 12 to control the shaping operation of the shaping device 12. Furthermore, more specifically, in the present example, the control PC 14 provides the input data indicating a shaped object in which coloring is performed on the surface, where hue can be visually recognized from the outside, to the shaping device 12.

As described above, in the present example, the shaping system 10 is configured by a plurality of devices, the shaping device 12 and the control PC 14. However, in a modified example of the shaping system 10, the shaping system 10 may be configured by a single device. In this case, for example, it is conceivable to configure the shaping system 10 with a single shaping device 12 also having the function of the control PC 14.

Next, a specific configuration of the shaping device 12 will be described. FIG. 1B shows an example of a configuration of a main part of a shaping device 12. In the present example, the shaping device 12 is a shaping device that shapes a stereoscopic shaped object 50 by layering layers of ink in a preset layering direction, and includes a head portion 102, a shaping table 104, and a scanning driver 106, and a controller 110.

Other than the points described below, the shaping device 12 may have a configuration same as or similar to a known shaping device. More specifically, other than the points described below, the shaping device 12 may have features same as or similar to a known shaping device that carries out shaping by ejecting a droplet to become the material of the shaped object 50 using an inkjet head. Furthermore, other than the illustrated configuration, the shaping device 12 may further include, for example, various types of configurations necessary for the shaping, and the like of the shaped object 50. Moreover, in the present example, the shaping device 12 is a shaping device (3D printer) that shapes a stereoscopic shaped object 50 through the layered shaping method. In this case, the layered shaping method is, for example, a method of shaping the shaped object 50 by overlapping a plurality of layers in the layering direction. The shaped object 50 is, for example, a stereoscopic three-dimensional structural object.

The head portion 102 is a part that ejects the material of the shaped object 50. Furthermore, in the present example, ink is used as the material of the shaped object 50. In this case, the ink is, for example, a functional liquid. Moreover, in the present example, liquid, and the like ejected from the inkjet head can also be considered as the ink, for example. More specifically, the head portion 102 ejects ink that cures according to predetermined conditions from a plurality of inkjet heads as the material of the shaped object 50. Then, by curing the ink after landing, the respective layers forming the shaped object 50 are formed in an overlapping manner, and a shaped object is shaped through the layered shaping method. In the present example, an ultraviolet curable ink (UV ink) that cures from a liquid state by being irradiated with an ultraviolet light is used as the ink. Furthermore, the head portion 102 ejects at least ink of a plurality of colors different from each other as the material of the shaped object.

The head portion 102 further ejects ink used as a support material, which is a material of the support layer 52, in addition to ink used as a material of the shaped object 50. The head portion 102 thereby forms the support layer 52 at a periphery of the shaped object 50, and the like as necessary. The support layer 52 is, for example, a layered structural object that supports at least a part of the shaped object 50 being shaped. The support layer 52 is formed as necessary at the time of shaping the shaped object 50 and removed after the shaping is completed.

The shaping table 104 is a table-shaped member that supports the shaped object 50 being shaped, and is disposed at a position facing the inkjet head in the head portion 102, and mounts the shaped object 50 being shaped and the support layer 52 on the upper surface thereof. Furthermore, in the present example, the shaping table 104 has a configuration in which at least the upper surface is movable in a layering direction (Z direction in the drawing), and moves at least the upper surface in accordance with the progress in the shaping of the shaped object 50 by being driven by the scanning driver 106. More specifically, in the present example, the layering direction is a direction orthogonal to the preset main scanning direction (Y direction in the figure) and the preset sub scanning direction (X direction in the figure) in the shaping device 12.

The scanning driver 106 is a driver that causes the head portion 102 to perform a scanning operation of relatively moving with respect to the shaped object 50 being shaped. In this case, "relatively moving with respect to the shaped object 50 being shaped" means, for example, relatively moving with respect to the shaping table 104. To cause the head portion 102 to perform the scanning operation means, for example, to cause the inkjet head of the head portion 102 to perform the scanning operation. Furthermore, in the present example, the scanning driver 106 causes the head portion 102 to perform the main scan (Y scanning), the sub scan (X scanning), and the layering direction scanning (Z scanning).

The main scan is, for example, an operation of ejecting ink while relatively moving in the main scanning direction with respect to the shaped object 50 being shaped. The sub scan is, for example, an operation of relatively moving with respect to the shaped object 50 being shaped in the sub scanning direction orthogonal to the main scanning direction. Furthermore, the sub scan can also be considered as, for example, an operation of relatively moving with respect to the shaping table 104 in the sub scanning direction by a preset feed amount, or the like. Moreover, the layering direction scanning is, for example, an operation of relatively moving the head portion 102 in the layering direction with respect to the shaped object 50 being shaped. The scanning driver 106 adjusts the relative position of the inkjet head with respect to the shaped object 50 being shaped in the layering direction by causing the head portion 102 to perform the layering direction scanning in accordance with the progress of the shaping operation.

The controller 110 is, for example, a CPU of the shaping device 12, and controls each part of the shaping device 12 to cause each part to execute an operation of forming the shaped object 50 and the support layer 52 in the shaping device 12. Furthermore, more specifically, in the present example, the controller 110 generates slice data based on the input data received from the control PC 14. In this case, the slice data is, for example, data indicating a cross section of the shaped object 50 and the support layer 52. The controller 110 generates a plurality of slice data corresponding to a plurality of positions in the layering direction set at preset intervals. In the operation of forming the respective layers of ink forming the shaped object 50, for example, each inkjet head is caused to eject ink used to form the shaped object 50 and the support layer 52 by controlling the operation of each inkjet head in the head portion 102 according to the slice data corresponding to the position of the layer of ink. In the present example, the slice data is an example of ejecting position specifying data which is data indicating the position to eject the ink of each color. The operation of generating the slice data based on the input data will be described in further detail later.

In the modified example of the shaping device 12, it is also conceivable to configure the shaping device 12 by a plurality of devices. In this case, for example, it is conceivable that at least a part of the function of the controller 110 is executed by a device different from the body that executes the shaping operation of the shaped object 50. Furthermore, in this case, it is conceivable to use a computer or the like as a device that executes at least a part of the function of the controller 110. In this computer, for example, at least a part of the process for generating slice data is assumed to be executed. Moreover, as such a computer, the control PC 14 can also be used. In this case, it can be considered that the entire shaping system 10 functions as the shaping device 12.

Now, a configuration of the head portion 102 in the shaping device 12 will be described in more detail. FIG. 1C shows an example of a configuration of a head portion 102. In the present example, the head portion 102 includes a plurality of inkjet heads, a plurality of ultraviolet light sources 204, and a flattening roller 206. As shown in the drawing, the plurality of inkjet heads include an inkjet head 202s, an inkjet head 202w, an inkjet head 202y, an inkjet head 202m, an inkjet head 202c, an inkjet head 202k, and an inkjet head 202t. The plurality of inkjet heads are, for example, arranged side by side in the main scanning direction with their positions in the sub scanning direction aligned. Furthermore, each inkjet head includes a nozzle row, in which a plurality of nozzles are lined in a predetermined nozzle row direction, on a surface facing the shaping table 104. Furthermore, in the present example, the nozzle row direction is a direction parallel to the sub scanning direction.

Among these inkjet heads, the inkjet head 202s is an inkjet head that ejects ink used as the support material. For example, a known material for the support layer can be suitably used for the support material. The inkjet head 202w is an inkjet head that ejects white (W color) ink. The white ink is an example of a light reflective ink, and is used, for example, when forming a light reflecting region, which is a region having a property of reflecting light in the shaped object 50. For example, the light reflecting region reflects light entering from the outside of the shaped object 50 when performing coloring with full color expression on the surface of the shaped object 50. The configuration of the shaped object 50 shaped by the shaping device 12 of the present example will be described in more detail later.

The inkjet head 202y, the inkjet head 202m, the inkjet head 202c, and the inkjet head 202k (hereinafter referred to as the inkjet heads 202y to 202k) are inkjet heads for coloring used at the time of shaping the colored shaped object 50. More specifically, the inkjet head 202y ejects ink of yellow color (Y color). The inkjet head 202m ejects ink of magenta color (M color). The inkjet head 202c ejects ink of cyan color (C color). Furthermore, the inkjet head 202k ejects ink of black color (K color). In addition, in the present example, each color of YMCK (CMYK) is an example of process colors used for full color expression by subtractive color mixing method. Each color of YMCK (CMYK) can be considered as, for example, an example of a basic color used in the CMYK color system. The inkjet head 202t is an inkjet head that ejects a clear ink. The clear ink is, for example, a clear (CL) ink that is colorless and transparent (T) with respect to visible light.

The plurality of ultraviolet light sources 204 are light sources (UV light sources) for curing ink, and generate an ultraviolet light that cures the ultraviolet curable ink. Moreover, in the present example, each of the plurality of ultraviolet light sources 204 is arranged on one end side and the other end side in the main scanning direction in the head portion 102 so as to sandwich the plurality of inkjet heads in between. For example, UVLED (ultraviolet LED) and the like can be suitably used for the ultraviolet light source 204. Furthermore, it is also conceivable to use a metal halide lamp, a mercury lamp, and the like for the ultraviolet light source 204. The flattening roller 206 is a flattening device for flattening the layer of ink formed during the shaping of the shaped object 50. The flattening roller 206, for example, flattens the layer of ink by making contact with a surface of the layer of ink and removing a part of the ink before being cured at the time of the main scan.

The layer of ink forming the shaped object 50 can be appropriately formed by using the head portion 102 having the configuration described above. Furthermore, the shaped object 50 can be appropriately shaped by forming a plurality of layers of ink in an overlapping manner.

The specific configuration of the head portion 102 is not limited to the configuration described above and can be variously modified. For example, the head portion 102 may further include an inkjet head for colors other than the above as an inkjet head for coloring. Furthermore, the arrangement of a plurality of inkjet heads in the head portion 102 can be variously modified. For example, the positions in the sub scanning direction of some inkjet heads may be shifted from the other inkjet heads.

Figure 2:
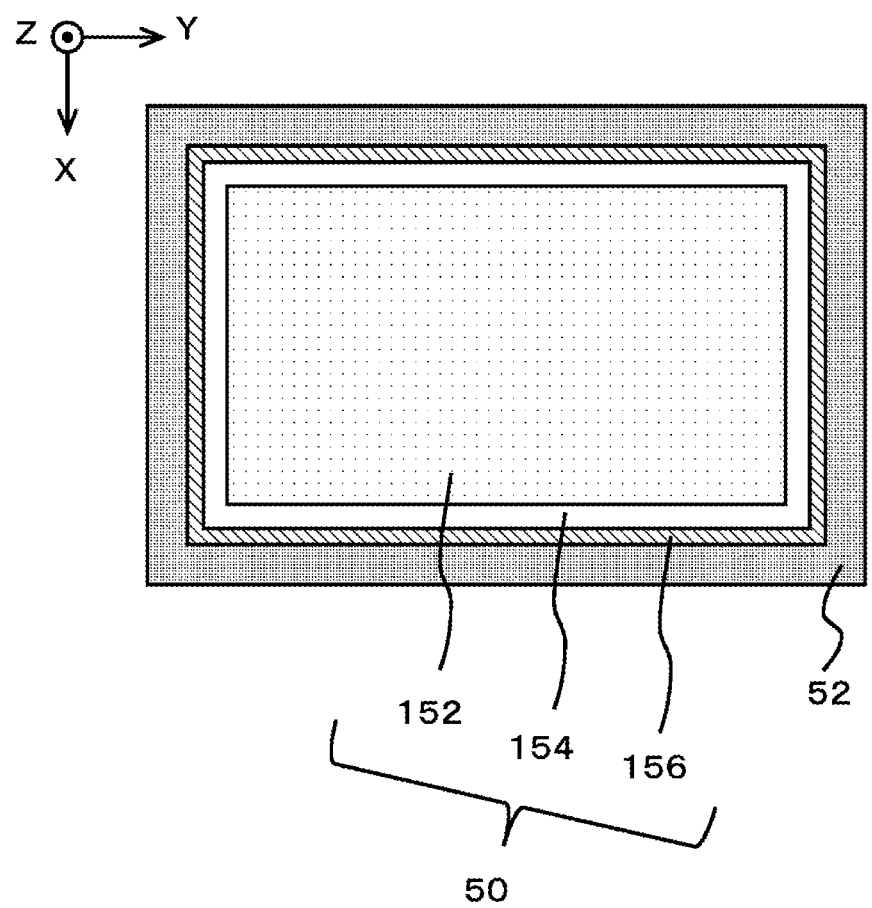
FIG. 2 is a view showing an example of a configuration of a shaped object 50 shaped with the shaping device 12 of the present example.

Next, a configuration of the shaped object 50 shaped by the shaping device 12 of the present example will be described in more detail. FIG. 2 is a view showing an example of the configuration of the shaped object 50 shaped by the shaping device 12 of the present example, and shows an example of the configuration of an X-Y cross section, which is a cross section of the shaped object 50 orthogonal to the layering direction (Z direction), together with the support layer 52. In this case, the configurations of the Z-X cross section and the Z-Y cross section of the shaped object 50 perpendicular to the Y direction and the Z direction also have similar configuration.

As described above, in the present example, the shaping device 12 (see FIGS. 1A to 1C) shapes the colored shaped object 50 using the inkjet heads 202y to 202k (see FIGS. 1A to 1C) and the like. In this case, a shaped object 50 in which at least a part of the surface is colored is shaped as the shaped object 50, for example. When the surface of the shaped object 50 is colored, this means that, for example, at least a part of a region where hue can be visually recognized from the outside is colored in the shaped object 50. Furthermore, in this case, the shaping device 12 shapes the shaped object 50 including an inner region 152, a light reflecting region 154, and a region to be colored 156, for example, as shown in the drawing. Moreover, the support layer 52 is formed at the periphery of the shaped object 50, and the like, as necessary.

The inner region 152 is a region that forms the inside of the shaped object 50. The inner region 152, for example, can also be considered as a region configuring the shape of the shaped object 50. In the present example, the shaping device 12 forms the inner region 152 using any ink other than the support material. In this case, for example, it is conceivable to form the inner region 152 using ink of any of a plurality of colors. Furthermore, the inner region 152 may be formed using only ink of one color, for example, according to the quality required on the shaped object 50 or the like. The light reflecting region 154 is a light reflective region (reflection layer) or reflecting light entering from the outer side of the shaped object 50 through the region to be colored 156. In the present example, the shaping device 12 forms the light reflecting region 154 at the periphery of the inner region 152 using white ink ejected from the inkjet head 202w (see FIGS. 1A to 1C).

The region to be colored 156 is a region (color layer) to be colored by inks for coloring ejected from the inkjet heads 202y to 202k. In the present example, the shaping device 12 uses the ink for coloring ejected from the inkjet heads 202y to 202k and the clear ink ejected from the inkjet head 202t (see FIGS. 1A to 1C) to form the region to be colored 156 at the periphery of the light reflecting region 154. In this case, for example, various colors are expressed by adjusting the ejection amount of the inks for coloring of each color to each position. Furthermore, the clear ink is used to compensate for a change in the amount of ink for coloring caused by the difference in color to a certain amount. According to such a configuration, for example, each position of the region to be colored 156 can be appropriately colored with a desired color.

In a modified example of the configuration of the shaped object 50, a specific configuration of the shaped object 50 may be made different from the above. More specifically, for example, it is conceivable to form the inner region 152 having also the function of the light reflecting region 154 by forming the inner region 152 using, for example, white ink without distinguishing the inner region 152 and the light reflecting region 154. Furthermore, for example, it is conceivable to further form a protective region and the like that covers the outer side of the region to be colored 156. In this case, for example, it is conceivable to form a transparent protective region using clear ink.

Figure 3:
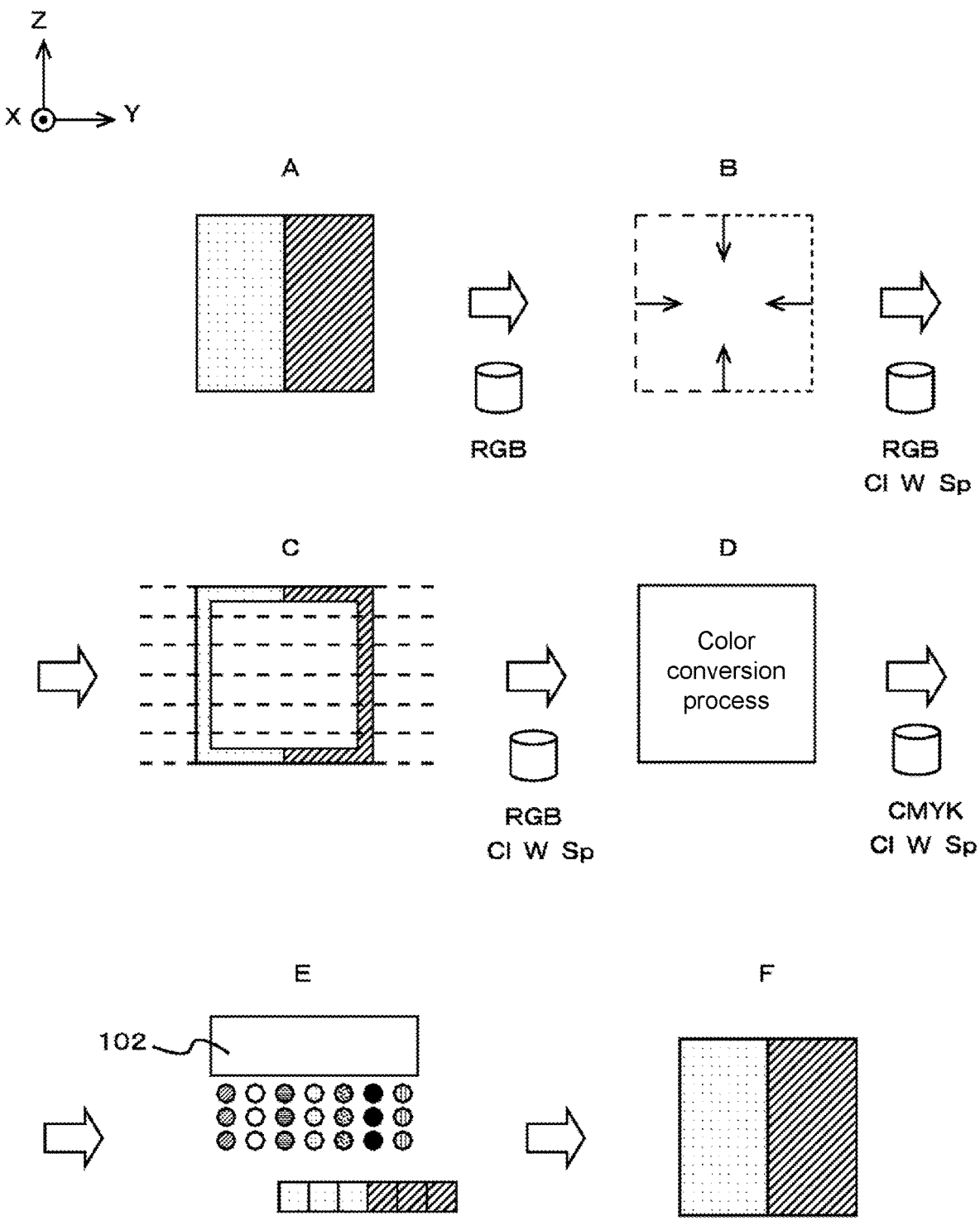
FIG. 3 is a view describing in more detail the operation of shaping the shaped object 50.

Next, the operation of shaping the shaped object 50 in the shaping system 10 of the present example will be described in more detail. FIG. 3 is a view describing in more detail the operation of shaping the shaped object 50, showing an example of an operation of generating slice data based on input data, an operation of ejecting ink based on slice data, and the like.

As described above, in the present example, the controller 110 (see FIGS. 1A to 1C) of the shaping device 12 generates slice data based on the input data received from the control PC 14 (see FIGS. 1A to 1C). Furthermore, in this case, as input data, for example, data of a three-dimensional object, in which the color is set with respect to the surface, as indicated by the reference symbol A in the figure is received. The figure indicated by the reference symbol A is a view showing a three-dimensional object by expressing the difference in the color of the surface with a paint pattern. Furthermore, in other figures in FIG. 3 as well, for the sake of convenience of illustration, the difference in color is shown by changing the paint pattern.

More specifically, in the present example, as input data, for example, 3D data (3D model data) with a texture attached to the surface is used. As such 3D data, known 3D data can be suitably used. Furthermore, in the present example, as the texture, a texture in which colors are expressed using each color of R (red), G (green), and B (blue) as basic colors is used. Such a texture can be considered as, for example, a texture expressed in full color using each color of RGB as basic colors. In this case, the texture can be considered as, for example, data color information data not including thickness information, and the like. The input data can be considered as, for example, data in which the color of each position on the surface is set by the attached texture, and the like.

In the present example, each RGB color used as a basic color in the input data is an example of an input basic color. An RGB color space, which is a color space that uses each RGB color as a basic color, is an example of an input color space. The RGB color space can be considered as, for example, a color space indicating colors in the RGB color system. In this case, the plurality of input basic colors configured by each color of RGB can be considered as an example of a plurality of basic colors in the input color space, for example. Furthermore, the input data used in the present example can be considered as, for example, data in which the color of at least a part of the shaped object is expressed in the input color space. Moreover, the input color space can be considered as, for example, a color space different from a material color space to be described later.

Furthermore, as described above, in the present example, in the shaping device 12, a shaped object including an inner region, a light reflecting region, and a region to be colored is shaped. Therefore, in the process of generating the slice data based on the input data, for example, a process of setting a thickness corresponding to each region is performed as indicated by reference symbol B in the figure. In this case, for example, the thickness corresponding to each region of the shaped object is set so that a part with a predetermined thickness in the normal direction of the shaped object becomes a region to be colored, and a part with a predetermined thickness on the inner side becomes a light reflecting region based on the color set to the surface of the shaped object in the input data. In the process, the color is set with respect to each position of each region of the shaped object by further using CL color corresponding to the clear ink and W color corresponding to the white ink. Moreover, when forming the support layer at the periphery of the shaped object, the Sp color, which is a color corresponding to the support material, is specified with respect to each position of the region to become the support layer.

When forming a support layer at the time of shaping a shaped object, it is conceivable to use the data that further indicates the shape and position of a support layer as input data. Moreover, for example, the shape and position of the support layer may be automatically set in the controller 110 based on the shape of the shaped object indicated in the input data, and the like.

In addition, after the setting corresponding to each region is performed as described above, for example, slice process, which is a process of slicing, is performed as indicated with a reference symbol C in the figure. The slice process can be considered, for example, as a process of generating data indicating a cross section of a shaped object at a position corresponding to each layer of ink to be layered at the time of shaping. More specifically, in the present example, in the slice process, the shape and color of the cross section of the shaped object at the position (each position in the layering direction) corresponding to each layer of ink layered at the time of shaping are set based on the input data. The data of each position generated by the slice process can be considered as, for example, slice data before color conversion process described later is performed. Furthermore, the slice data before the color conversion process is performed can be considered as, for example, slice data in which the color at each position of the region to be colored is expressed in the input color space.

Furthermore, in the present example, the color conversion process is carried out, for example, as indicated by a reference symbol D in the drawing following the slice process. More specifically, in the present example, in the color conversion process, the color is converted such that the color is expressed in a material color space which is a color space of a color of the ink for coloring with respect to the slice data in which the color at each position of the region to be colored is expressed in the input color space. In this case, the material color space can be considered as, for example, a color space corresponding to the color of the material used for coloring the shaped object. Furthermore, in the present example, the material color space is a CMYK color space which is a color space in which each color of CMYK is used as a basic color. In this case, each color of CMYK is an example of a material basic color which is a basic color in the material color space. The plurality of material basic colors constituted by each color of CMYK is an example of a plurality of basic colors in the material color space. Furthermore, the CMYK color space can be considered as, for example, a color space indicating colors in the CMYK color system, and the like.

Furthermore, more specifically, in the color conversion process performed in the present example, for example, a process of converting a color expressed by a plurality of input basic colors in the slice data before performing the color conversion process to a color expressed by a plurality of material basic colors is performed. Moreover, by performing such a color conversion process, the controller 110 generates slice data in which colors are expressed using each color of CMYK as basic colors instead of each color of RGB. Such slice data can be considered as an example of an ejecting position specifying data in which the color for at least a part of the shaped object is expressed in the material color space, for example.

In the process of generating slice data based on the input data, each process other than the color conversion process can be performed in a manner same as or similar to a known process performed when generating slice data. The color conversion process performed in the present example will be described later in more detail.

In addition, after the slice data is generated as described above, the controller 110 causes each inkjet head in the head portion 102 (see FIGS. 1A to 1C) to eject ink of each color based on the slice data, for example, as indicated with a reference symbol E in the figure. The operation of causing the head portion for each color to eject ink of each color based on the slice data can be performed, for example, in a manner same as or similar to the known shaping device 12. In this case, a plurality of layers of ink configuring the shaped object 50 and the support layer 52 can be layered by causing the head portion 102 to sequentially form the layer of ink corresponding to the slice data corresponding to each position in the layering direction. The operation of layering the layers of ink can be considered as, for example, a dot layering operation of layering the dots of ink. In this case, after the operation of layering the layer of ink is completed, the operation of removing the support layer is performed as necessary. According to such a configuration, for example, the shaping (output) of a desired shaped object can be appropriately carried out as indicated, for example, with a reference symbol F in the figure.

Figure 4A:
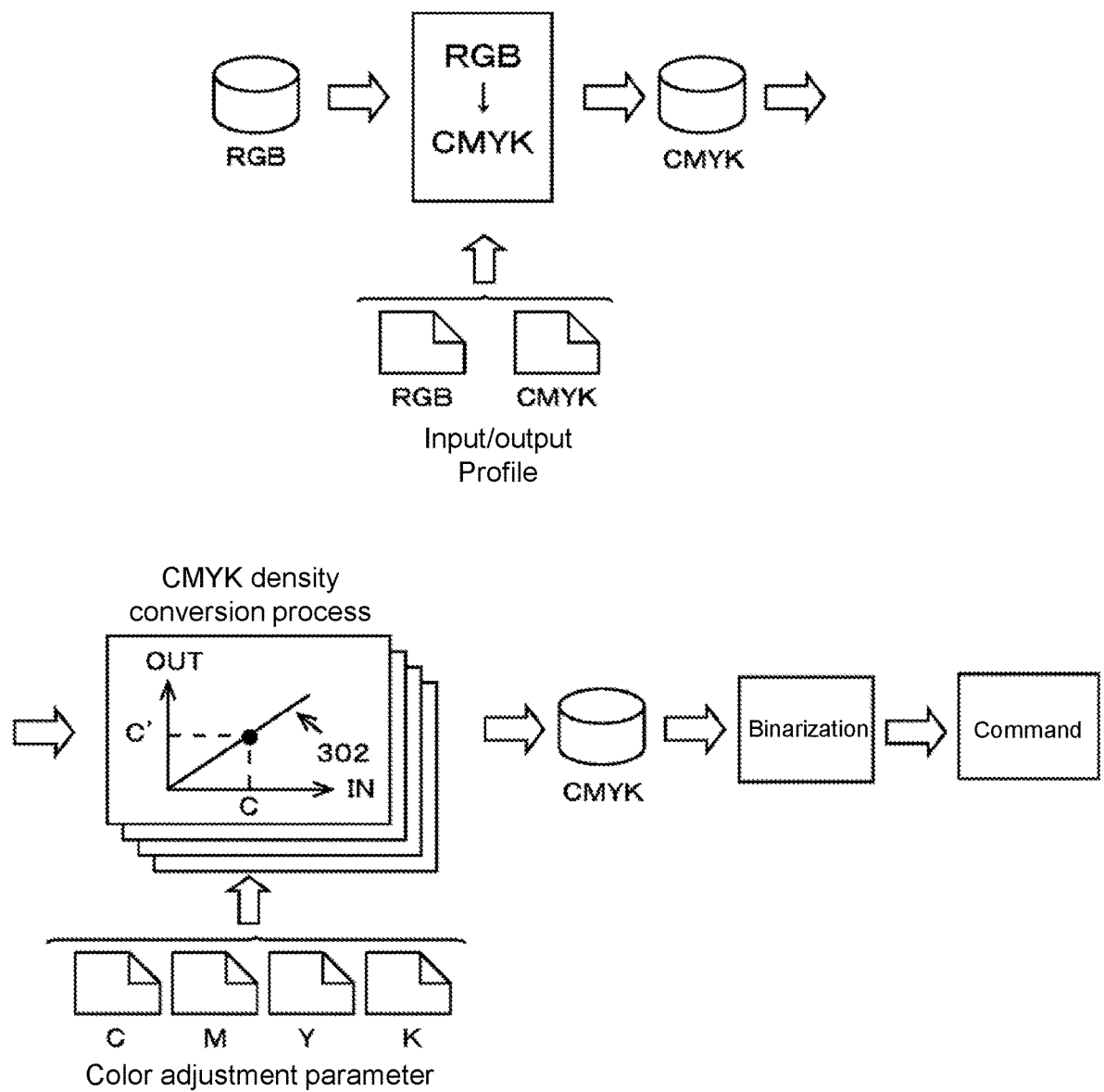
FIGS. 4A and 4B are views describing a color conversion process in more detail.
Figure 4B:
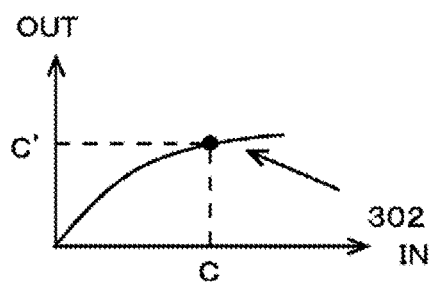

Now, a color conversion process carried out in the present example will be described in more detail. FIGS. 4A and 4B are views describing the color conversion process in more detail. FIG. 4A shows an example of an operation of the color conversion process. As described above, the color conversion process performed in the present example is a process of performing color conversion so that the color is expressed in the material color space with respect to the slice data in which the color of each position of the region to be colored is expressed in the input color space. In this case, the RGB color space is used as the input color space, and the CMYK color space is used as the material color space.

Furthermore, in the present example, as described in detail below, such color conversion is performed using a profile that associates a color in the input color space and a color in the material color space, and a color adjustment parameter. In this case, the profile is, for example, data that associates a color space on the input side and a color space on the output side with respect to a device or the like. Furthermore, in the present example, for example, an ICC profile is used as the profile. Moreover, in the profile, for example, a color space different from both the input color space and the material color space may be used as a connection color space, and the color in the input color space and the color in the material color space may be associated through the connection color space. In this case, as the connection color space, for example, a color space that does not depend on the device or the like is preferably used. In this case, the profile used in the color conversion process can be considered as, for example, a profile synthesizing an input profile which is a profile on the input side that associates a color in the input color space and a color in the connection color space, and an output profile which is a profile on the output side that associates a color in the connection color space and a color in the material color space. In this case, for example, it is conceivable to use the Lab color space as the connection color space. More specifically, in this case, for example, it is conceivable to use an ICC profile that associates the RGB color space and the Lab color space as the input profile. As the output profile, for example, it is conceivable to use an ICC profile that associates the Lab color space and the CMYK color space.

With this configuration, for example, a profile that associates colors in the RGB color space with colors in the CMYK color space can be appropriately used. In addition, for example, the color expressed in the RGB color space in the slice data before the color conversion process is performed can be appropriately converted to the color expressed in the CMYK color space. Furthermore, as such a profile, for example, a profile same as or similar to a profile used in a known color conversion process can be used. In the present example, the color conversion performed using the profile is an example of a profile conversion process. The profile conversion process is, for example, a process of converting a color expressed by each color of RGB, which is a plurality of input basic colors, to a color expressed by each color of CMYK, which is a plurality of material basic colors, based on the profile. The profile can also be considered as, for example, a conversion table for determining the color after conversion in the color conversion process.

In the color conversion process in the present example, color adjustment using the color adjustment parameters is performed in addition to the color conversion performed using the profile. More specifically, in the present example, color adjustment is performed using color adjustment parameters with respect to the result of performing color conversion using a profile. In this case, the color adjustment performed using the color adjustment parameter is an example of a post-conversion adjustment process in which adjustment is performed on the result of the profile conversion process. Furthermore, in this case, the color adjustment parameter can be considered as, for example, a parameter used for adjustment performed with respect to the color conversion performed using a profile. Moreover, the color adjustment performed using the color adjustment parameter can be considered as, for example, a process of adjusting the value of the conversion table used in the color conversion process.

In the present example, as shown in the figure, for example, color adjustment using the color adjustment parameters is performed by adjusting each color based on the color adjustment parameters for each color using the color adjustment parameters prepared in advance for each color of CMYK colors, which are a plurality of material basic colors. In this case, as a color adjustment parameter for each color, for example, a parameter for associating a value before adjustment and a value after adjustment is used for one color. The value before adjustment is, for example, the color density before adjustment. The value after adjustment is, for example, the density of the color after adjustment. The parameter for associating the value before adjustment and the value after adjustment may be, for example, a parameter that specifies a correspondence relationship such as a function that determines the association. The adjustment of color performed using such a color adjustment parameter can be considered as, for example, a density conversion process for converting the color density.

More specifically, in the present example, as shown as CMYK density conversion process in the figure, the adjustment of color is performed by associating the value before adjustment and the value after adjustment according to a preset color density curve 302. The color density curve 302 can be considered as, for example, a curve (color density curve) that specifies how to adjust the color density. As such a color density curve 302, for example, as shown in the figure, it is conceivable to use a curve showing an increasing function in which the corresponding value after adjustment gradually increases as the value before adjustment increases. Furthermore, in this case, by using a parameter specifying the curve shape of the color density curve 302 as a color adjustment parameter, what kind of adjustment is to be performed for each color can be specified.

Furthermore, as can be understood from the graphs and the like shown in the figure, the color adjustment (density conversion process) performed in the present example may be considered as, for example, a process for converting input values to output values according to the color density curve 302. More specifically, the graph shown in the figure shows an example of the color density curve 302 specified by the color adjustment parameter for C color. The value C is an example of a color density that is input as a value before adjustment. The value C' is an example of the color density that is output as the value after adjustment. The value C and the value C' are associated with each other by a color density curve 302 as shown in the figure. With such a configuration, the adjustment based on a color adjustment parameter can be appropriately performed for the density of C color. Although a specific illustration of the color density curve 302 is omitted, adjustment based on the color adjustment parameter can be appropriately performed in the same manner for each color other than the C color.

Furthermore, in this case, with respect to the color density curve 302, the shape of the curve can be changed by changing the color adjustment parameter. FIG. 4B shows an example of a color density curve 302 that is different from the case shown in FIG. 4A. As can be understood from the figure, the result of the color conversion process can be changed by changing the color density curve 302. In this case, the color adjustment parameter can be considered as, for example, a parameter for specifying a function in which the value after adjustment is determined according to the value before adjustment. The color adjustment parameter is not limited to a parameter that directly specifies a function corresponding to the color density curve 302, and may be a parameter that associates a value before adjustment and a value after adjustment through other methods. In this case, for example, it is conceivable to prepare, as a color adjustment parameter, an association of values before and after adjustment with respect to a plurality of representative values, and perform association by interpolation process for other values.

Furthermore, in the present example, after color conversion using a profile and color adjustment using a color adjustment parameter are performed, binarization process and command conversion process are performed to complete slice data. In this case, the binarization process is, for example, a process of specifying a position where ink of each color is to be ejected by performing a halftone process in accordance with a shaping condition. The command conversion is, for example, a process of converting slice data into a predetermined format that can be executed by the shaping device 12. The binarization process and the command conversion process can be performed in a manner same as or similar to the binarization process and the command conversion process performed in a known process for generating slice data. Furthermore, the process for generating slice data by performing the color conversion process, the binarization process, and the like as described above can be considered as 3DRIP process which is a RIP process in three dimensions. In this case, the color adjustment parameter can also be considered as an adjustment value for performing color adjustment in the 3DRIP process. In addition, by performing the above processes, for example, slice data specifying a position to where ink is to be ejected at the time of forming each ink can be appropriately generated.

Here, it is conceivable that the shaping device 12 shapes a shaped object 50 having various shapes. Furthermore, regarding the color of the shaped object 50, even if the coloring is performed under the same conditions in design, the appearance differ due to the shape of the shaped object 50 and the like. As a result, there may be a difference between the color of the completed shaped object 50 and the imaged color. In such a case, for example, the input data may be re-edited with modeling software or the like to adjust the color. However, when adjusting the color in such a manner, the labor required for reworking increases, and the work efficiency greatly reduces.

On the other hand, in the present example, color adjustment can be performed using the color adjustment parameter in the color conversion process performed in the process of generating the slice data based on the input data. In this case, the result of the color conversion process can be changed by changing the color adjustment parameter. Such adjustment can be performed only by changing the specified color adjustment parameter without re-editing the input data and the like.

More specifically, it is conceivable that the specification and change of the color adjustment parameter can be performed by, for example, receiving an instruction for selecting any one of a plurality of color adjustment parameters prepared in advance from the user. Furthermore, for example, it is conceivable to use a numerical value for specifying the shape of the color density curve 302 as a color adjustment parameter and to specify or change the color adjustment parameter by receiving a numerical value input from the user. Then, it can be considered that such specification and change of the color adjustment parameter are performed on an operation screen for the shaping device 12 or the like. Furthermore, as an operation screen for the shaping device 12, for example, the control PC 14 (see FIGS. 1A to 1C) may be used. In this case, since it is possible to specify or change the color adjustment parameter after inputting the input data to the shaping device 12, the results of the color conversion process can be variously changed without re-editing the input data, and the like. Furthermore, for example, this makes it possible to easily and appropriately adjust the color of the shaped object 50 while appropriately preventing increase in labor due to rework.

In addition, in order to adjust the color of the shaped object 50, for example, it seems that the content of the profile may be directly changed instead of using the color adjustment parameter. Furthermore, for example, it is conceivable to prepare a plurality of profiles in advance and change the manner of converting the color by allowing the user to select a profile. However, a profile such as an ICC profile is usually data including many values. Therefore, it is difficult for the user to directly change individual values. Furthermore, since a profile includes many values, the size of the profile becomes large, and thus the storage capacity required for saving the profile is greatly increased when preparing a plurality of profiles and attempting to adjust the color at high accuracy. Moreover, it is conceivable that a large number of man-hours for preparing multiple profiles is required. On the other hand, in the present example, the color can be adjusted more easily and appropriately by using a color adjustment parameter that specifies the color density curve 302 for each color of CMYK.

Next, an application example of performing color adjustment using color adjustment parameters will be described. As described above, in the present example, it is possible to adjust the way the color is seen in the shaped object by performing the adjustment using the color adjustment parameter. In addition, the color adjustment parameter may be used, for example, to adjust a difference in characteristics of each shaping device 12.

Furthermore, for example, it is also conceivable to use the color adjustment parameter in association with the thickness of the region to be colored 156 (see FIG. 2) in the shaped object. In this case, the thickness of the region to be colored 156 is, for example, the thickness in the normal direction of the shaped object 50. In addition, using the color adjustment parameter in association with the thickness of the region to be colored 156 means, for example, selecting the color adjustment parameter in accordance with the thickness of the region to be colored 156 when the thickness of the region to be colored 156 is changed. On the other hand, it is also conceivable to use the color adjustment parameter in association with the thickness of the region to be colored 156 by setting the thickness of the region to be colored 156 in accordance with the color adjustment parameter selected by the user. Moreover, the operation which uses a color adjustment parameter like above can be considered as, for example, an example of the operation for setting a color adjustment parameter according to the structure of the shaped object.

Figure 5A:
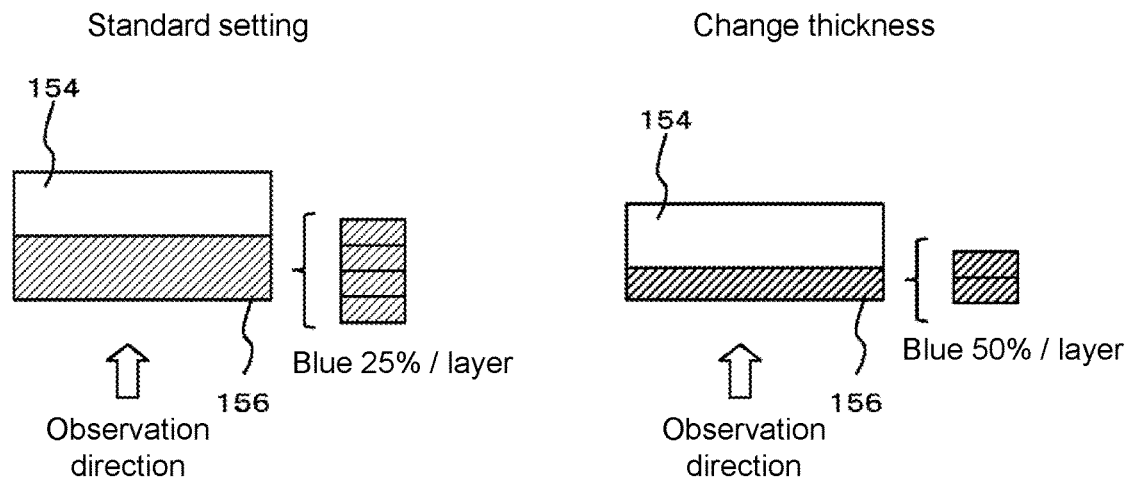
FIGS. 5A to 5C are views describing a relationship between a thickness of a region to be colored 156 and a color adjustment parameter in more detail.
Figure 5B:
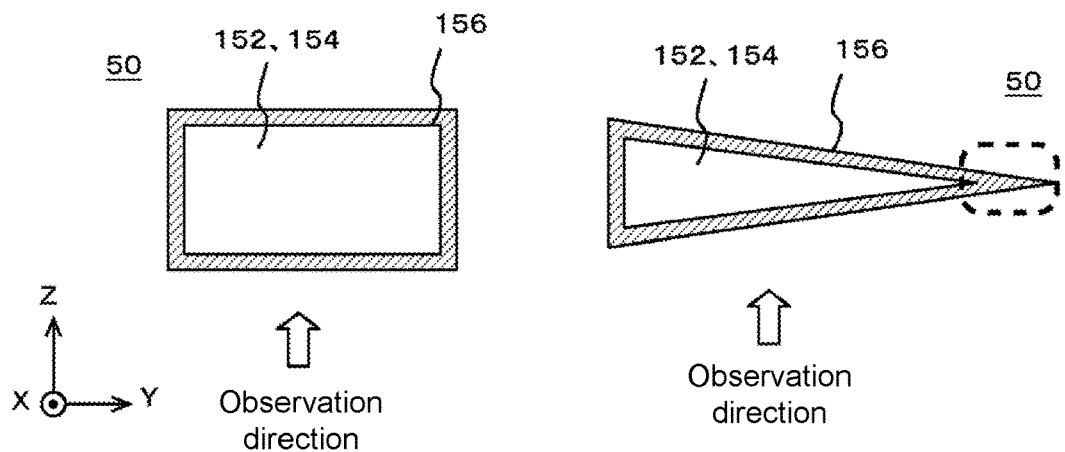
Figure 5C:
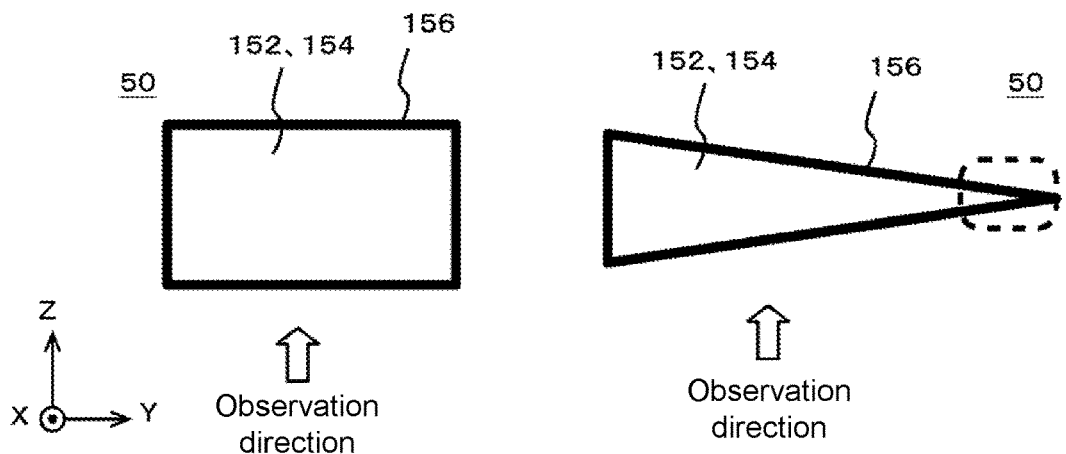

FIGS. 5A to 5C are views describing the relationship between the thickness of the region to be colored 156 and the color adjustment parameter in more detail. FIG. 5A shows an example of the relationship between the thickness of the region to be colored 156 and the color density. As described above, in the present example, when shaping a shaped object whose surface is colored, the light reflecting region 154 and the region to be colored 156 are formed. In this case, the density of the color expressed in the region to be colored 156 varies depending on the thickness of the region to be colored 156. More specifically, the color expressed in the region to be colored 156 is considered to be darker the larger the thickness of the region to be colored 156 in the normal direction of the shaped object 50. Therefore, the region to be colored 156 is usually formed so that the thickness in the normal direction is constant (e.g., about 150 μm). The thickness being constant means, for example, that the difference from the standard thickness is within a predetermined tolerable range. In this case, in the color conversion process, color conversion is performed in accordance with the thickness of the region to be colored 156.

More specifically, the left view in FIG. 5A shows an example of the configuration of the region to be colored 156 in a case where the region to be colored 156 having a thickness in which four layers of ink are layered is formed. In this case, it is considered that the color density viewed from the observation direction shown in the figure is substantially four times the color density in one layer of ink. Therefore, when trying to make the color seen from the observation direction a blue color with a predetermined 100% density, as shown in the figure, a blue color with a density of 25% is expressed in one layer of ink, and the region to be colored 156 having a thickness of four layers is formed.

Furthermore, the right view in FIG. 5A shows an example of the configuration of the region to be colored 156 in a case where the region to be colored 156 having a thickness in which two layers of ink are layered is formed. In this case, it is considered that the color density viewed from the observation direction shown in the figure is substantially twice the color density in one layer of ink. Therefore, when trying to make the color seen from the observation direction a blue color with a predetermined 100% density, similar to the case shown in the left view, as shown in the figure, a blue color with a density of 50% is expressed in one layer of ink, and the region to be colored 156 having a thickness of two layers is formed.

In this case, in the color conversion process performed at the time of generating slice data, the color conversion is performed so that the color density in one layer of ink becomes a density corresponding to the entire thickness of the region to be colored 156. For such color conversion, it is conceivable to change the color adjustment parameter according to the thickness of the region to be colored 156 using a common profile. More specifically, in this case, as described above, it is conceivable to prepare in advance a color adjustment parameter associated with the thickness of the region to be colored 156, and change a color adjustment parameter to be used according to the thickness of the region to be colored 156. In this case, in the color conversion process, the controller 110 (see FIGS. 1A to 1C) in the shaping device 12 changes the color adjustment parameter to be used, for example, according to the thickness of the region to be colored 156. With this configuration, for example, it is possible to appropriately adjust the color according to the thickness of the region to be colored 156. Accordingly, for example, even when the thickness of the region to be colored 156 is changed, the color conversion process according to the thickness of the region to be colored 156 can be appropriately performed.

Furthermore, in this case, in the process of generating the slice data based on the input model, it may be possible to adjust the thickness of the region to be colored 156 based on a user instruction. In this case, for example, it is conceivable to receive from the user specification of the color adjustment parameter or shaping conditions and the like associated in advance with the color adjustment parameter, and set the thickness of the region to be colored 156 to a thickness corresponding to the specified color adjustment parameter.

FIGS. 5B and 5C show examples of adjusting the thickness of the region to be colored 156. Among these, FIG. 5B shows an example of a configuration of a cross section of the shaped object 50 when the region to be colored 156 is formed with a standard (default) thickness for the two types of shaped objects 50 shown on the left and right in the figure. In this case, for example, in the shaped object 50 shown in the figure on the left side, the light reflecting region 154 and the like are formed on the inner side at any part of the region to be colored 156, and thus the light that entered the shaped object 50 from outside the shaped object 50 is reflected by the light reflecting region 154.

On the other hand, when a shaped object 50 having a thin thickness at a part is shaped as shown in the figure on the right side of FIG. 5B, as shown surrounded with a broken line in the figure, the thickness of a part of the shaped object 50 becomes only the thickness of the region to be colored 156, and the light reflecting region 154 and the like cannot be formed on the inner side thereof. In this case, it is considered that most of the light entering the relevant portion from the outside of the shaped object 50 is transmitted through the shaped object 50 without being reflected inside the shaped object 50. As a result, it is conceivable that in such a portion, an impression that the shaped object 50 is transparent, the way a color is seen is different from other portions, and the like may occur.

More specifically, for example, when the region to be colored 156 is formed so that the color viewed from the observation direction is blue with a predetermined 100% density, it is considered that blue having 100% density is actually visually recognized at the portion where the light reflecting region 154 is formed inside the shaped object 50 shown in the figure on the left side and the shaped object 50 shown in the figure on the right side. However, at a portion where the light reflecting region 154 is not formed in the shaped object 50 shown in the figure on the right side, the light may not appear blue having 100% density due to the influence of the light entering from the outside transmitting through the relevant portion.

In such a case, for example, as shown in FIG. 5C, it is conceivable that the region to be colored 156 or the like is also formed at a thin portion of the shaped object 50 by changing the thickness of the region to be colored 156. FIG. 5C shows an example of a configuration of a cross section of the shaped object 50 when the region to be colored 156 is formed by making the thickness smaller than the standard thickness for the two types of shaped objects 50 shown on the left and right in the figure. Furthermore, in this case, it is conceivable to perform color conversion process in accordance with the thickness of the region to be colored 156 by performing color adjustment (CMYK density adjustment) using the color adjustment parameter.

More specifically, as described above with reference to FIG. 5A and the like, in the present example, the color density (color density per layer) in one layer of ink is increased, so that, even when the region to be colored 156 is thinned, it is possible to keep the color density of the entire region to be colored 156 unchanged. In addition, for example, even when the thickness of the region to be colored 156 is reduced as shown in FIG. 5C, the color visually recognized from the outside of the shaped object 50 is made the same as that in the configuration shown in FIG. 5B.

Furthermore, in this case, by reducing the thickness of the region to be colored 156, the light reflecting region 154 can be formed even with respect to the details of the shaped object 50 where the light reflecting region 154 cannot be formed when the region to be colored 156 having a standard thickness is formed. In this case, for example, the light reflecting region 154 can be formed even at a portion surrounded by a broken line in the figure on the right side of FIG. 5C. As a result, it is possible to appropriately prevent the way the color is seen from changing in such a portion. For example, in a case where the region to be colored 156 is formed so that the color viewed from the observation direction is blue having a predetermined 100% density, it is assumed that blue having a 100% density is actually visually recognized even at the portion surrounded by a broken line in the figure on the right side in the shaped object 50 shown on the right and left in the figure. Therefore, according to the present example, for example, coloring can be more appropriately performed on the shaped object 50 having various shapes.

Next, supplementary explanation on the configuration described above, explanation of modified examples and the like will be made. In the description made above, a case where the color adjustment performed using the color adjustment parameter is mainly performed commonly on the entire shaped object 50 has been described. However, in the color conversion process, color adjustment different from that on other parts may be performed on a part of the shaped object 50. In this case, for example, it is conceivable to perform color adjustment performed using different color adjustment parameters on a plurality of different regions in the shaped object 50.

More specifically, in the stereoscopic shaped object 50, for example, difference may occur in the way the color is seen depending on the position of the shaped object 50 as the surfaces are configured by planes inclined at various angles. In such a case, for example, it may be possible to change the manner of adjusting the color depending on the region of the shaped object 50. Furthermore, in this case, in the color conversion process, the controller 110 (see FIGS. 1A to 1C) in the shaping device 12 uses, for example, the profile and the first color adjustment parameter to perform color conversion on the first region in the shaped object 50. Then, the controller uses the profile and the second color adjustment parameter different from the first color adjustment parameter to perform color conversion on the second region in the shaped object different from the first region in the shaped object 50. In this case, for the profile, for example, the same profile is used for the entire shaped object 50. With such a configuration, for example, the adjustment of the color that matches each region of the shaped object 50 can be appropriately performed.

Furthermore, in this case, it is conceivable to determine which color adjustment parameter to use for which region based on, for example, a user's instruction. The user's instruction may be received, for example, through the control PC 14 (see FIGS. 1A to 1C). More specifically, in this case, the controller 110 receives, for example, an instruction to select the first region and an instruction to select the first color adjustment parameter from the user. According to such a configuration, for example, adjustment based on a user's instruction can be appropriately performed on each region of the shaped object. Furthermore, in this case, it is conceivable that an instruction to select a region and a color adjustment parameter is received for the second region as well. In addition, it is conceivable to perform color adjustment through a preset standard method with respect to regions to which user's specification is not received.

Figure 6A:
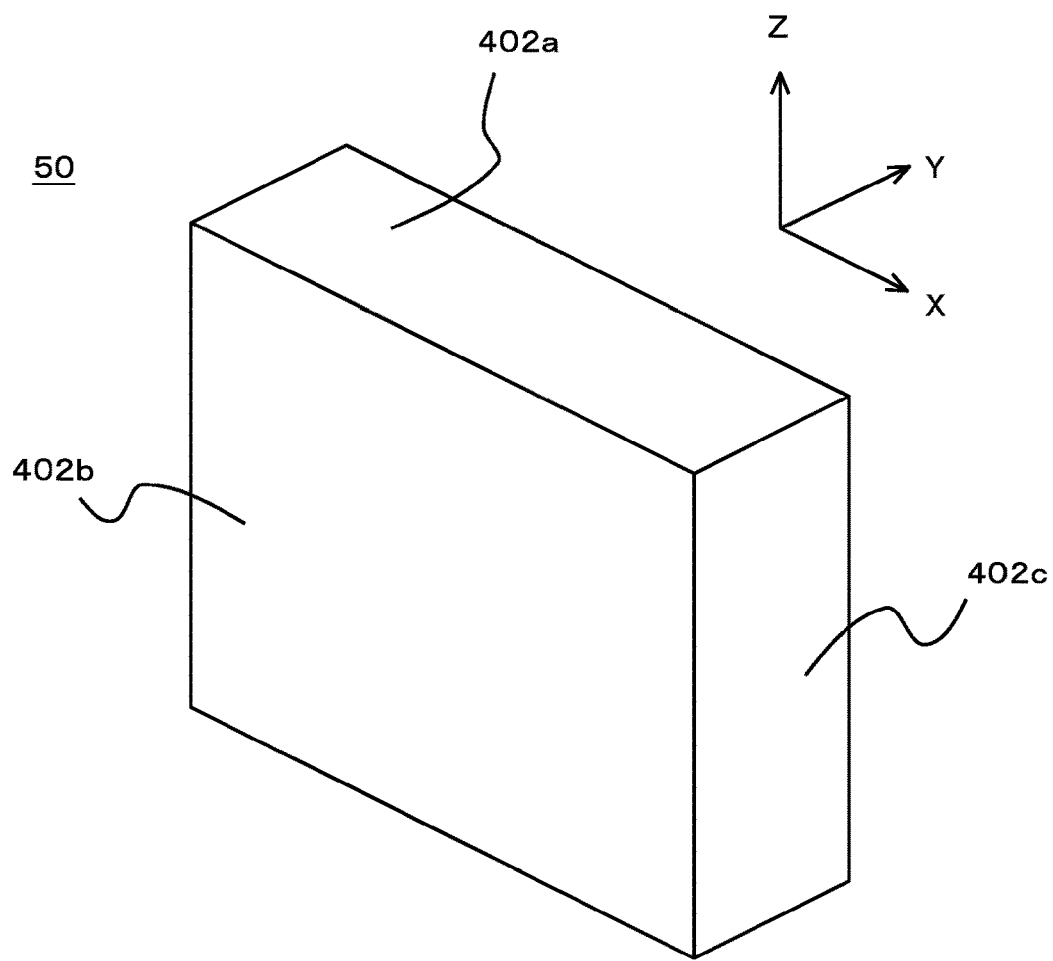
FIGS. 6A and 6B are views describing a modified example of a manner of adjusting the color performed using a color adjustment parameter.
Figure 6B:
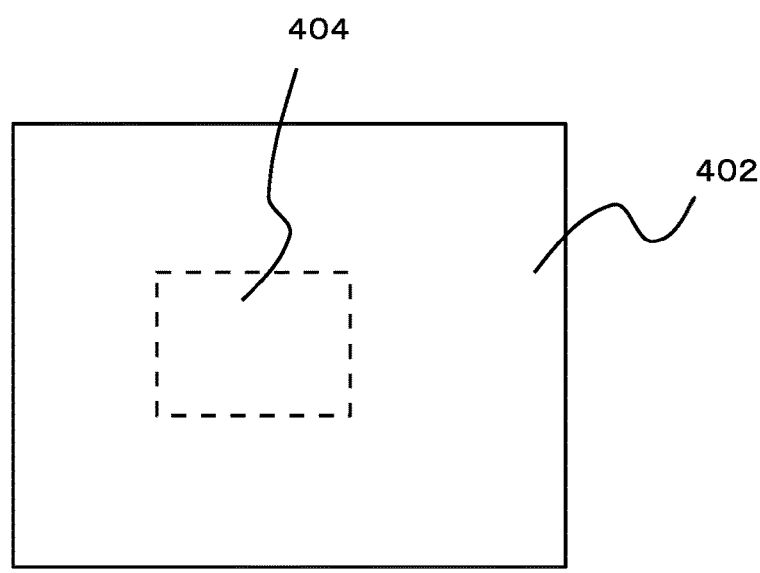

Furthermore, more specifically, for example, such color adjustment for each region may be performed as described below using FIGS. 6A and 6B. FIGS. 6A and 6B are views describing a modified example of a manner of adjusting the color performed using the color adjustment parameter. FIGS. 6A and 6B show examples of a region to be selected when adjustment of color for each region is performed using the color adjustment parameter.

In a case where the manner of adjusting the color varies depending on the region of the shaped object 50, for example, it is conceivable to set the manner of adjusting the color for each plane configuring the surface of the shaped object 50. The plane configuring the surface of the shaped object 50 is a region continuously connected on the surface of the shaped object 50, such as planes 402a to 402c shown in FIG. 5A. Regarding the plane configuring the surface of the shaped object 50, for example, it can also be considered as a region and the like continuously connected in a state that can be assumed that it is facing substantially the same direction. In this case, for example, it is conceivable to set a region corresponding to any plane in the surface of the shaped object 50 as the first region to which color adjustment is performed using the first color adjustment parameter. The region corresponding to any plane in the surface of the shaped object 50 is, for example, a region to be colored formed at the position of the relevant plane. Furthermore, for example, it is conceivable to set a region corresponding to any plane other than the plane corresponding to the first region as the second region to which color adjustment is performed using the second color adjustment parameter. In this case, as the second region, for example, it is conceivable to set a region corresponding to a plane in which an inclination with respect to the horizontal plane is different from the plane corresponding to the first region in the surface of the shaped object 50. With such a configuration, for example, color adjustment for every plane can be appropriately performed. In this case, for example, it is conceivable to perform color adjustment (color density conversion process etc.) for each plane by associating individual color adjustment parameter with respect to each plane (e.g., each of up, down, left, right, front, and back planes) in the shaped object 50. According to such a configuration, the color of each plane in the shaped object 50 can be more appropriately adjusted. Furthermore, for example, a difference can be appropriately prevented from occurring in the way the color is seen depending on the plane.

In addition, as a region to perform color adjustment using the color adjustment parameter, for example, a region 404 narrower than the plane 402 may be selected as shown in FIG. 6B. In this case, it is conceivable to perform color adjustment using the first color adjustment parameter for a region 404 forming a part of one plane 402, and to perform color adjustment using the second color adjustment parameter different from the first color adjustment parameter for a part other than the region 404 in the plane 402. Even when configured in such a way, the color can be adjusted more appropriately with respect to each part of the shaped object 50.

In the description made above, a case where the color adjustment using the color adjustment parameter is performed mainly on the color after conversion performed using the profile has been described. However, the color adjustment using the color adjustment parameter may be performed, for example, on a color before conversion performed using a profile. More specifically, in this case, the controller 110 in the shaping device 12 performs pre-conversion adjustment process before performing a profile conversion process in the color conversion process. The pre-conversion adjustment process is, for example, a process of performing color adjustment based on the color adjustment parameter prepared in advance for each color of a plurality of input basic colors before the color conversion process performed based on a profile. More specifically, when converting from a color in the RGB color space to a color in the CMYK color space in the color conversion process, it is conceivable to adjust the density of each color of RGB based on the color adjustment parameter prepared for each color of RGB in the pre-conversion adjustment process. Furthermore, in this case, the color expressed in the RGB color space by the density after the color density is adjusted is converted to a color in the CMYK color space based on a profile. With such a configuration, for example, the color conversion with respect to the color adjusted by the pre-conversion adjustment process can be appropriately performed in the profile conversion process. Thus, for example, the color of the shaped object can be appropriately adjusted using the profile and the color adjustment parameter. Moreover, in this case as well, the profile conversion process can be considered as, for example, a process of converting a color expressed by a plurality of input basic colors to a color expressed by a plurality of material basic colors based on the profile.

In the description made above, a case where the color adjustment parameter used in the color conversion process is selected mainly based on a user instruction or the like has been described. However, it is conceivable that the color adjustment parameter may be automatically selected regardless of the user's instruction or the like. In this case, for example, the color adjustment parameter may be automatically set in the controller 110 of the shaping device 12 based on the shape of the shaped object indicated by the input data and the like. In addition, regarding the selection of the color adjustment parameter that is automatically performed, for example, it is conceivable that the measurement of a color with respect to the result of actually performing the shaping is performed, and the color adjustment parameter is automatically selected based on the measurement result. More specifically, in this case, the controller 110 in the shaping device 12 measures, for example, the color expressed in the shaped object shaped in the past by the shaping device 12, and then sets the color adjustment parameter to use at the time of shaping the shaped object to be subsequently shaped based on the relevant result. According to such a configuration, for example, color adjustment can be performed more easily and appropriately.

Furthermore, the selection of the color adjustment parameter may be performed automatically using, for example, an artificial intelligence (AI) technique. In this case, it is conceivable that the relationship between the color measurement result and the color adjustment parameter to be selected is learned in advance by artificial intelligence. Furthermore, as a method of using artificial intelligence, for example, consideration is made to automatically select the color adjustment parameter suitable for the shape of the shaped object by performing machine learning using data indicating the relationship between the shape of the shaped object and the way the color is seen.

In the description made above, the color adjustment performed using the color adjustment parameter has been described mainly for a case where basic colors such as CMYK colors or RGB colors are targeted. However, the color adjustment performed using the color adjustment parameter is not limited to these basic colors, and may be performed on other colors (e.g., W color). For example, when an ink of a special color other than the basic color is used as the ink for coloring or the like, the color may be adjusted using a color adjustment parameter with respect to the special color. In this case, it is conceivable to use a profile that includes a special color in the color after conversion as the profile.

INDUSTRIAL APPLICABILITY

The present disclosure can be suitably used in, for example, a shaping device.

What is claimed is:
1. A shaping device for shaping a shaped object that is stereoscopic in which at least a part is colored, the shaping device comprising:
 a head portion that ejects materials of a plurality of colors different from each other as a material of the shaped object; and
 a controller that controls an operation of the head portion based on an ejecting position specifying data indicating a position to eject the material of each color, the ejecting position specifying data being data in which a color with respect to at least a part of the shaped object is expressed in a material color space which is a color space corresponding to the color of the material used to color the shaped object,
 wherein the controller is configured to generate the ejecting position specifying data based on an input data input as data indicating the shaped object, the input data being data in which a color of at least a part of the shaped object is expressed in an input color space which is a color space different from the material color space, and
 in a process of generating the ejecting position specifying data, the controller is configured to perform a color conversion process of converting a color using at least of:
  a profile that associates the color in the input color space with the color in the material color space, and
  a color adjustment parameter which is a parameter used for adjustment performed for color conversion performed using the profile, wherein the controller is configured to perform a color adjustment based on the color adjustment parameter, the color adjustment is a color density conversion process for converting an input value of a color density before adjustment to an output value of a color density after adjustment according to a color density curve, where a horizontal axis of the color density curve represents the input value and a vertical axis of the color density curve represents the output value, wherein the color adjustment parameter specifies the color density curve that is set for each of the plurality of colors, and in the color conversion process, the controller is configured to change the color adjustment parameter to use in accordance with a thickness of the colored region in a normal direction of the shaped object, and the normal direction is a direction perpendicular to a surface of the shaped object;

wherein the colored region having the thickness in which a plurality of layers of the material are layered, and in a place where a light reflecting region is provided behind the colored region when viewed from the normal direction, in response to make a color of the colored region seen from the normal direction with a color density of 100%, each layer of the material has a color with a color density of 100% divided by a number of the plurality of layers, as the color density of each layer of the material is increased, the number of the plurality of layers is decreased, so that the thickness of the colored region is thinner;

as the color density of each layer of the material is decreased, the number of the plurality of layers is increased, so that the thickness of the colored region is thicker.

2. The shaping device according to claim 1, wherein
the color conversion process is a process of converting a color expressed by a plurality of input basic colors which are a plurality of basic colors in the input color space to a color expressed by a plurality of material basic colors which are a plurality of basic colors in the material color space, in the color conversion process, the controller is configured to perform:
  a profile conversion process of converting a color expressed by the plurality of input basic colors into a color expressed by the plurality of material basic colors based on the profile, and
  a post-conversion adjustment process of adjusting color based on the color adjustment parameter prepared in advance for each color of the plurality of material basic colors, which is a process of performing adjustment with respect to a result of the profile conversion process.

3. The shaping device according to claim 1, wherein
the color conversion process is a process of converting a color expressed by a plurality of input basic colors which are a plurality of basic colors in the input color space to a color expressed by a plurality of material basic colors which are a plurality of basic colors in the material color space, in the color conversion process, the controller is configured to perform:
  a pre-conversion adjustment process, being performed before the process of converting the color performed based on the profile, which is a process of adjusting a color based on the color adjustment parameter prepared in advance for each color of the plurality of input basic colors, and
  a profile conversion process, performing conversion of color with respect to a color subjected to adjustment by the pre-conversion adjustment process, which is a process of converting a color expressed by the plurality of input basic colors into a color expressed by the plurality of material basic colors based on the profile.

4. The shaping device according to claim 1, wherein
in the color conversion process, the controller is configured to:
  perform color conversion using the profile and a first color adjustment parameter with respect to a first region in the shaped object, and
  perform color conversion using the profile and a second color adjustment parameter different from the first color adjustment parameter, with respect to a second region of the shaped object different from the first region in the shaped object.

5. The shaping device according to claim 2, wherein
in the color conversion process, the controller is configured to:
  perform color conversion using the profile and a first color adjustment parameter with respect to a first region in the shaped object, and
  perform color conversion using the profile and a second color adjustment parameter different from the first color adjustment parameter, with respect to a second region of the shaped object different from the first region in the shaped object.

6. The shaping device according to claim 3, wherein
in the color conversion process, the controller is configured to:
  perform color conversion using the profile and a first color adjustment parameter with respect to a first region in the shaped object, and
  perform color conversion using the profile and a second color adjustment parameter different from the first color adjustment parameter, with respect to a second region of the shaped object different from the first region in the shaped object.

7. The shaping device according to claim 4, wherein
the controller is configured to receive an instruction to select the first region and an instruction to select the first color adjustment parameter from a user.

8. The shaping device according to claim 5, wherein
the controller is configured to receive an instruction to select the first region and an instruction to select the first color adjustment parameter from a user.

9. The shaping device according to claim 6, wherein
the controller is configured to receive an instruction to select the first region and an instruction to select the first color adjustment parameter from a user.

10. The shaping device according to claim 4, wherein
the first region is a region corresponding to any plane in a surface of the shaped object, and
the second region is a region corresponding to a plane in which an inclination with respect to a horizontal plane is different from a plane corresponding to the first region in the surface of the shaped object.

11. The shaping device according to claim 7, wherein
the first region is a region corresponding to any plane in a surface of the shaped object, and
the second region is a region corresponding to a plane in which an inclination with respect to a horizontal plane is different from a plane corresponding to the first region in the surface of the shaped object.

12. The shaping device according to claim 1, wherein the controller is configured to:
    measure the color expressed in the shaped object previously shaped by the shaping device; and
    set the color adjustment parameter for the subsequently shaped object.

13. The shaping device according to claim 1, wherein the shaped object is shaped, the shaped object including:
    a light reflecting region, provided using a light reflective material; and
    a region to be colored, formed at a periphery of the light reflecting region, which is a region being colored using the material of a plurality of colors; and
    in the color conversion process, the controller is configured to change the color adjustment parameter to use according to a thickness of the region to be colored.

14. The shaping device according to claim 1, wherein the shaping device is configured to shape the shaped object by layering layers of the material in a preset layering direction, and
    the controller is configured to perform:
    a slice process for setting the shape and color of a cross section of the shaped object at a position corresponding to each layer based on the input data, and
    the color conversion process to generate the ejecting position specifying data that specifies a position of ejecting the material at a time of forming each layer.

15. A shaping method for shaping a shaped object that is stereoscopic in which at least a part is colored, the shaping method comprising:
    using a head portion that ejects materials of a plurality of colors different from each other as a material of the shaped object;
    controlling an operation of the head portion based on an ejecting position specifying data indicating a position to eject the material of each color, the ejecting position specifying data being data in which a color with respect to at least a part of the shaped object is expressed in a material color space which is a color space corresponding to the color of the material used to color the shaped object;
    generating, in the control of the operation of the head portion, the ejecting position specifying data based on an input data input as data indicating the shaped object, the input data being data in which a color of at least a part of the shaped object is expressed in an input color space which is a color space different from the material color space; and
    performing, in a process of generating the ejecting position specifying data, a color conversion process of converting a color using at least of:
    a profile that associates the color in the input color space with the color in the material color space, and
    a color adjustment parameter which is a parameter used for adjustment performed for color conversion performed using the profile,
    wherein a color adjustment is performed based on the color adjustment parameter, the color adjustment is a color density conversion process for converting an input value of a color density before adjustment to an output value of a color density after adjustment according to a color density curve, where a horizontal axis of the color density curve represents the input value and a vertical axis of the color density curve represents the output value,
    wherein the color adjustment parameter specifies the color density curve that is set for each of the plurality of colors, and
    in the color conversion process, the controller is configured to change the color adjustment parameter to use in accordance with a thickness of the colored region in a normal direction of the shaped object, and the normal direction is a direction perpendicular to a surface of the shaped object;
    wherein the colored region having the thickness in which a plurality of layers of the material are layered, and
    in a place where a light reflecting region is provided behind the colored region when viewed from the normal direction, in response to make a color of the colored region seen from the normal direction with a color density of 100%, each layer of the material has a color with a color density of 100% divided by a number of the plurality of layers,
    as the color density of each layer of the material is increased, the number of the plurality of layers is decreased, so that the thickness of the colored region is thinner;
    as the color density of each layer of the material is decreased, the number of the plurality of layers is increased, so that the thickness of the colored region is thicker.

16. A shaping device for shaping a shaped object that is stereoscopic having a colored region in which at least a part is colored, the shaping device comprising:
    a head portion that ejects materials of a plurality of colors different from each other as a material forming the colored region of the shaped object; and
    a controller that controls an operation of the head portion based on an ejecting position specifying data indicating a position to eject the material of each color, the ejecting position specifying data being data in which a color with respect to at least a part of the shaped object is expressed in a material color space which is a color space corresponding to the color of the material used to color the shaped object,
    wherein the controller is configured to generate the ejecting position specifying data based on an input data input as data indicating the shaped object, the input data being data in which a color of at least a part of the shaped object is expressed in an input color space which is a color space different from the material color space, and
    in a process of generating the ejecting position specifying data, the controller is configured to perform a color conversion process of converting a color using at least of:
    a profile that associates the color in the input color space with the color in the material color space, and
    a color adjustment parameter which is a parameter used for adjustment performed for color conversion performed using the profile,
    wherein the color adjustment parameter specifies a color density curve that is set for each of the plurality of colors, and
    in the color conversion process, the controller is configured to change the color adjustment parameter to use in accordance with a thickness of the colored region in a normal direction of the shaped object, and the normal direction is a direction perpendicular to a surface of the shaped object;
    wherein the colored region having the thickness in which a plurality of layers of the material are layered, and in a place where a light reflecting region is provided behind the colored region when viewed from the normal direction, in response to make a color of the colored region seen from the normal direction with a color density of 100%, each layer of the material has a color with a color density of 100% divided by a number of the plurality of layers, as the color density of each layer of the material is increased, the number of the plurality of layers is decreased, so that the thickness of the colored region is thinner;

as the color density of each layer of the material is decreased, the number of the plurality of layers is increased, so that the thickness of the colored region is thicker.

* * * * *